United States Patent
Leonardi et al.

(10) Patent No.: US 10,541,577 B2
(45) Date of Patent: Jan. 21, 2020

(54) UTILIZATION OF MAGNETIC FIELDS IN ELECTRIC MACHINES HAVING SKEWED ROTOR SECTIONS AND SEPARATORS WITH CUTOUTS

(71) Applicant: Ford Global Technologies, LLC, Dearborn, MI (US)

(72) Inventors: Franco Leonardi, Dearborn Heights, MI (US); Mark Allan Lippman, New Baltimore, MI (US); Michael W. Degner, Novi, MI (US); Feng Liang, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 14/994,438

(22) Filed: Jan. 13, 2016

(65) Prior Publication Data
US 2017/0201138 A1    Jul. 13, 2017

(51) Int. Cl.
*H02K 1/27*    (2006.01)

(52) U.S. Cl.
CPC ............... *H02K 1/276* (2013.01); *H02K 1/27* (2013.01); *H02K 1/2706* (2013.01)

(58) Field of Classification Search
CPC ........... H02K 2201/06; H02K 2201/03; H02K 2201/15; H02K 1/27; H02K 1/276; H02K 1/2766; H02K 1/01; H02K 1/2706; H02K 1/2726; H02K 1/2733; H02K 1/274; H02K 1/2746; H02K 1/278; H02K 1/2786; H02K 1/30
USPC .................. 310/114, 112, 216.008, 216.009, 310/216.015–216.019, 156.01–156.47, 310/156.53, 156.56, 156.57, 156.72, 310/216.016, 216.025, 216.035, 216.044, 310/216.017, 216.031–216.072, 216.082, 310/216.106–216.109
See application file for complete search history.

(56) References Cited

U.S. PATENT DOCUMENTS

| | | | |
|---|---|---|---|
| 4,053,801 A | * | 10/1977 | Ray .................. H02K 1/26 310/216.017 |
| 4,712,027 A | | 12/1987 | Karidis |
| 5,679,995 A | | 10/1997 | Nagate et al. |
| 5,844,343 A | | 12/1998 | Horst |

(Continued)

FOREIGN PATENT DOCUMENTS

EP         2887503 A1    2/2014

OTHER PUBLICATIONS

Magneitc Properties of Solids from hyperphsics.edu.*

(Continued)

*Primary Examiner* — Mang Tin Bik Lian
*Assistant Examiner* — Maged M Almawri
(74) *Attorney, Agent, or Firm* — Brooks Kushman PC; David Kelley

(57) ABSTRACT

An electric machine may include an adjacent pair of laminations each defining pockets having permanent magnets arranged therein to form magnetic poles. The laminations may be stacked in a pole-skewed fashion to form a portion of a rotor. A stator may surround the rotor. The machine may further include a separator lamination between the adjacent pair defining cutout portions having a shape based on a superposition of shapes of the pockets to increase a reluctance of leakage paths between the permanent magnets.

12 Claims, 6 Drawing Sheets

(56) References Cited

U.S. PATENT DOCUMENTS

| | | | |
|---|---|---|---|
| 5,864,196 A | 1/1999 | Yun | |
| 5,973,426 A | 10/1999 | Fujinaka et al. | |
| 6,177,748 B1 | 1/2001 | Katcher et al. | |
| 6,236,134 B1 | 5/2001 | Syverson | |
| RE37,576 E | 3/2002 | Stephens et al. | |
| 6,727,623 B2 | 4/2004 | Horst et al. | |
| 6,750,584 B2 | 6/2004 | Smith | |
| 6,891,297 B2 * | 5/2005 | Shimada | H02K 1/2766 310/152 |
| 6,952,064 B2 | 10/2005 | Howaki et al. | |
| 7,342,338 B2 | 3/2008 | Miyazaki et al. | |
| 7,362,025 B2 | 4/2008 | Utaka | |
| 7,397,159 B2 | 7/2008 | Yoshinaga | |
| 7,525,229 B1 | 4/2009 | Willig et al. | |
| 7,795,772 B2 | 9/2010 | Kawasaki et al. | |
| 7,800,272 B2 | 9/2010 | Nakayama et al. | |
| 7,946,025 B2 | 5/2011 | Lindberg et al. | |
| 8,018,109 B2 | 9/2011 | Leonardi et al. | |
| 8,138,641 B2 | 3/2012 | Sakamoto et al. | |
| 8,890,385 B2 | 11/2014 | Sane et al. | |
| 9,030,076 B2 * | 5/2015 | Sato | H02K 1/148 310/216.016 |
| 9,225,228 B2 | 12/2015 | Hasuo et al. | |
| 9,537,361 B2 | 1/2017 | Hisada | |
| 9,641,033 B2 | 5/2017 | Papini et al. | |
| 2003/0102751 A1 | 6/2003 | Bryant | |
| 2005/0179334 A1 * | 8/2005 | Yoshinaga | H02K 21/14 310/156.47 |
| 2006/0012252 A1 | 1/2006 | Miyata et al. | |
| 2006/0066169 A1 | 3/2006 | Daugherty et al. | |
| 2006/0244335 A1 * | 11/2006 | Miyazaki | H02K 1/278 310/156.47 |
| 2007/0296285 A1 | 12/2007 | Enomoto et al. | |
| 2009/0045688 A1 * | 2/2009 | Liang | H02K 1/2766 310/156.07 |
| 2009/0072655 A1 | 3/2009 | Sano et al. | |
| 2009/0127962 A1 * | 5/2009 | Ohyama | H02K 1/276 310/156.53 |
| 2010/0171450 A1 | 7/2010 | Quere | |
| 2010/0301697 A1 * | 12/2010 | Takahashi | H02K 1/2766 310/156.53 |
| 2012/0133230 A1 * | 5/2012 | Jansen | H02K 1/2766 310/156.12 |
| 2013/0127280 A1 * | 5/2013 | Sugimoto | H02K 1/2766 310/156.01 |
| 2013/0270952 A1 * | 10/2013 | Jurkovic | H02K 1/2766 310/156.01 |
| 2013/0285500 A1 * | 10/2013 | Kinashi | H02K 1/276 310/156.53 |
| 2013/0292941 A1 | 11/2013 | Mountain et al. | |
| 2013/0334925 A1 | 12/2013 | Uematsu et al. | |
| 2014/0042851 A1 | 2/2014 | Takemoto et al. | |
| 2014/0062253 A1 | 3/2014 | Andonian | |
| 2014/0070640 A1 | 3/2014 | Tolpadi et al. | |
| 2014/0084732 A1 * | 3/2014 | Hisada | H02K 1/276 310/156.08 |
| 2014/0125180 A1 | 5/2014 | Thaler et al. | |
| 2014/0292132 A1 | 10/2014 | Kazmin et al. | |
| 2015/0084456 A1 | 3/2015 | Chang et al. | |
| 2015/0130386 A1 | 5/2015 | Zumstein et al. | |
| 2015/0244218 A1 | 8/2015 | Kaufmann et al. | |
| 2015/0380995 A1 * | 12/2015 | Mochida | H02K 1/2766 310/156.53 |
| 2016/0020653 A1 * | 1/2016 | Ueda | H02K 1/276 310/43 |
| 2016/0276880 A1 | 9/2016 | Ueda et al. | |

OTHER PUBLICATIONS

R. Clarke; Magnetic Properties of Materials; 2008; http://info.ee.surrey.ac.uk/Workshop/advice/coils/muff/#mu, pp. 1-22.

* cited by examiner

UTILIZATION OF MAGNETIC FIELDS IN ELECTRIC MACHINES HAVING SKEWED ROTOR SECTIONS AND SEPARATORS WITH CUTOUTS

TECHNICAL FIELD

The present disclosure relates to magnetic field utilization for a rotor of an electric machine.

BACKGROUND

Electric machines typically employ a rotor and stator to produce torque. Electric current flows through the stator windings to produce a magnetic field. The magnetic field generated by the stator may cooperate with permanent magnets on the rotor to generate torque.

SUMMARY

An electric machine may include an adjacent pair of sections each defining pockets having permanent magnets arranged therein to form magnetic poles. The sections may be stacked in a pole-skewed fashion to form a portion of a rotor. A stator may surround the rotor. The machine may further include a separator section between the adjacent pair defining cutout portions having a shape based on a superposition of shapes of the pockets to increase a reluctance of leakage paths between the permanent magnets.

A separator section may have material with a magnetic permeability less than two disposed within the cutout portions. A pair of sections and separator sections may be made out of different materials. The thickness of the separator section may be less than a thickness of other sections.

DETAILED DESCRIPTION

Figure 1A:
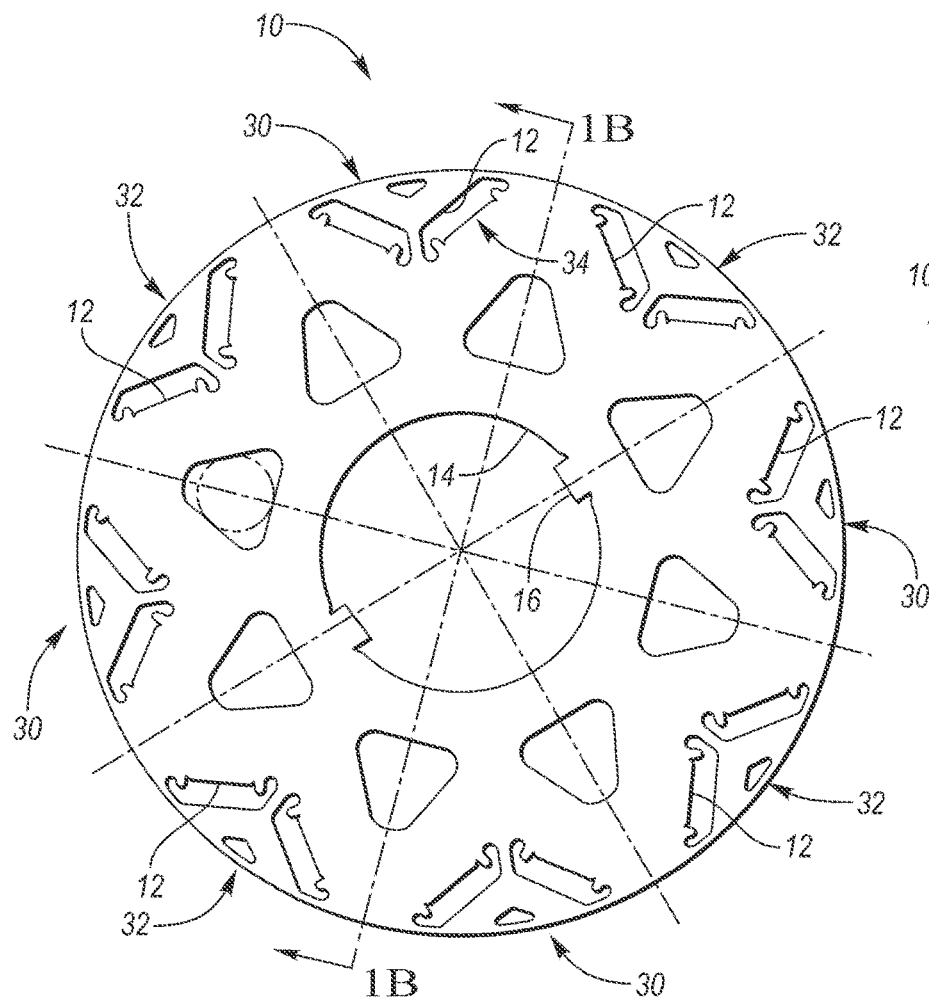
FIG. 1A is a plan view of a rotor section.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines are characterized by an undesirable oscillation in the torque which is caused by harmonics present in the airgap flux and in the airgap permeance. Most electric machines, and in particular Permanent Magnet (PM) electric machines, are designed with rotor skew i.e. the sections of active rotor material may be skewed, or staggered, along the axis of the rotor. Skewing may result in staggered permanent magnets and magnetic poles along the axis of the rotor. Skewed sections may cause an overall reduction in the average torque of the machine at all available speeds because the magnetic components are out of alignment, but skewing helps to minimize the harmonics, as discussed above.

For example, in the case of an 8-pole machine with two rotor sections, 48-slot stator, a typical skew angle is 3.75°. The skewing of the rotor is intended to produce a smoother mechanical torque than would otherwise be achieved using a rotor having aligned permanent magnets. Skewing may eliminate undesirable torque ripple caused by harmonics and many different skew angles may be used to achieve this result. Skew, however, does not contemplate two poles that are supposed to be aligned by design but because of manufacturing tolerances are not exactly aligned.

The average torque generated across all speeds of the electric machine may be reduced by skewing, in part, because magnetic field leakage may occur between skewed permanent magnets. This leakage may cause a small reduction in the available torque of the machine, and the leakage may not exist on non-skewed machines.

Skewing may open a path for magnetic flux to leak from one lamination section to the adjacent one, without adding torque. Because magnetic fields generally follow the path of least resistance between opposite poles, the skewing and staggering of permanent magnets to reduce torque ripple may, consequently, cause additional magnetic flux leakage to occur. A section of the rotor may be comprised of one lamination or a plurality of laminations stacked together. The laminations of a section may be skewed relative to other laminations in the section or skewed collectively, relative to other sections of the rotor. This means a section of the rotor may be comprised of any number of laminations stacked together or a single block of composite material.

In order to maximize the magnetic field and resulting torque, the amount of active rotor material is typically maximized. Active rotor material may include a material capable of generating or carrying a magnetic or electric field. Maximization of this material, in theory, generates the most torque. Rotor materials with the highest magnetic permeability are chosen. An introduction of materials without high magnetic permeability would presumably decrease the torque generation of the electric machine because the rotor would have wasted space (i.e., material that does not generate torque). Materials with high magnetic permeability may be generally referred to as ferromagnetic or ferrimagnetic. Presumably, a rotor composed of entirely active rotor material would create a more effective magnetic field than a rotor composed of partially active rotor material.

The introduction of a magnetically reluctant layer or layers that is not active rotor material, unexpectedly increases the utilization of permanent magnets in the rotor and increases the torque output of the electric machine. For example, the introduction of a reluctant layer with a thickness twice that of the airgap thickness between the stator and rotor may provide a specific torque increase greater than 0.25%. This amount, while seemingly nominal, can justifiably decrease the cost of electric machines because the improved utilization of permanent magnets may allow the size of the permanent magnets to be reduced. The increase in specific torque of the electric machine may depend on the thickness of the layer relative to the airgap and the electric current flowing through the stator.

Permanent magnets may have multiple orientations when disposed on or within the sections. For example, permanent magnets may be arranged in a V-shape position providing poles at each V. Permanent magnets may also be oriented such that one of the magnetic poles is directed radially outward. The orientation and position of the magnets may have a direct effect on the electric machine's efficiency, and any skewed orientation or position may cause magnetic field leakage between the permanent magnets.

The poles of the permanent magnets may individually or cooperatively form magnetic poles of the rotor. Many rotors have a plurality of permanent magnets arranged to cooperate with the stator's magnetic field in order to generate torque. The poles may be generated using permanent magnets, induced fields, excited coils, or a combination thereof.

Laminations are generally made of materials with high magnetic permeability. This high magnetic permeability allows magnetic flux to flow through the laminations without losing strength. Materials with high magnetic permeability may include iron, electrical steel, ferrite, or many other alloys. Rotors with laminations may also support an electrically conductive cage or winding to create an induced magnetic field. A rotor having four laminations or sections of laminations may have the sections configured in an ABBA orientation. The ABBA orientation means that the "A" sections are skewed to the same degree relative to the "B" sections. The rotor may have other lamination configurations (e.g., ABC or ABAB).

A separator section made of electric steel or other magnetically permeable material may be placed between adjacent sections having permanent magnets. This separator section may define cutout portions or inserts comprised of materials or matter with low magnetic permeability. Areas or cutouts of low magnetic permeability may be strategically placed and specifically tailored to redirect the permanent magnet's magnetic fields into a more desirable course. Areas of low magnetic permeability may have a solid, liquid, or gas phase. The areas may be a diamagnetic or paramagnetic material (e.g., water, copper, bismuth, superconductors, wood, air, and vacuum), and many different types of matter are capable of obtaining similar results and fall into these designations. Materials with low magnetic permeability may be able to reduce the field leakage between sections with skewed poles or redirect the field onto a more desirable course. This redirection or reduction may increase the generated torque of the machine.

A separator section comprised of magnetically permeable and non-permeable material may shape the magnetic flux along the rotor's axis to provide a more desirable magnetic field. A separator section with portions of electric steel or magnetic material may maintain the magnetic flux through the rotor and may provide additional torque output when compared with a separator section made of non-permeable material. A separator section may have an outer rim of material to maintain a desired airgap between the stator and rotor along the length of the rotor. An inner volume may have magnetically and non-magnetically permeable areas. A variety of shapes or sizes of cut-out portions of non-permeable areas may provide appreciable magnetic flux redirection. In at least one embodiment, the shapes may be a superposition of the pockets for permanent magnets of the rotor. A separator section may be made of entirely the same material with doped or altered material states providing varying levels of magnetic permeability to form the areas or cutouts of low magnetic permeability.

A relationship may exist between the specific torque output of the electric machine, the thickness of the separator section, and the applied current. A separator section may be designed to have the same thickness as the airgap between the rotor and the stator. Typically, an airgap distance for an electric machine may range between 0.5 mm to 1.0 mm. For example, an airgap may have a thickness of 0.7 mm. A separator section having portions, cutouts, or pockets of low magnetic permeability may be 0.85 mm. The thickness of separator section having portions of low magnetic permeability may be increased or decreased to benefit a particular electric machine. A rotor with a partially reluctant separator section having a thickness of 1.7 mm may generate higher torque than a rotor without a partially reluctant separator lamination.

Figure 1B:
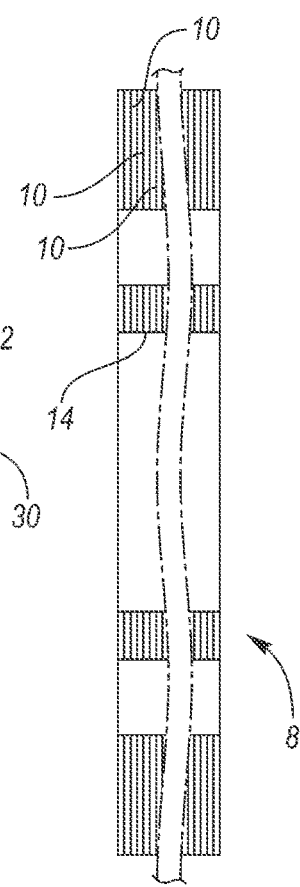
FIG. 1B is a side view of the rotor section comprised of a stack of laminations for the electric machine shown in FIG. 1A.

Referring now to FIG. 1A, a section 10 for a rotor is shown. The section 10 may define a plurality of pockets or cavities 12 adapted to hold permanent magnets. The center of the section 10 may define a circular central opening 14 for accommodating a driveshaft with a keyway 16 that may receive a drive key (not shown). The cavities may be oriented such that the permanent magnets (not shown) housed in the pockets or cavities 12 form eight alternating magnetic poles 30, 32. It is well known in the art that an electric machine may have various numbers of poles. The magnetic poles 30 may be configured to be north poles. The magnetic poles 32 may be configured to be south poles. The permanent magnets may also be arranged with different patterns. As shown in FIG. 1A, the pockets or cavities 12, which hold permanent magnets, are arranged with a V-shape 34. Referring now to FIG. 1B, a plurality of sections 10 may form a rotor 8. The rotor has a circular central opening 14 for accommodating a driveshaft (not shown).

Figure 2A:
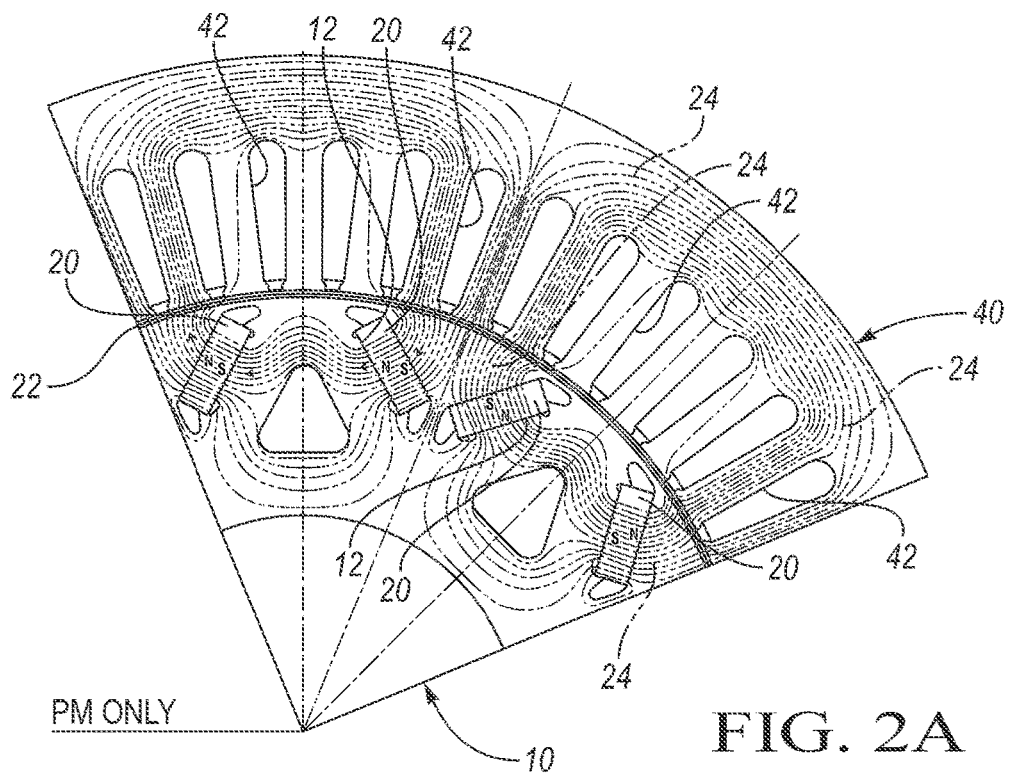
FIG. 2A is a diagrammatic view of an electric machine with a rotor comprised of multiple poles, wherein flux lines are generated solely by a permanent magnet.

Referring now to FIG. 2A, a portion of the section 10 is shown within a stator 40. The section 10 defines pockets or cavities 12 adapted to hold permanent magnets 20. The permanent magnets 20 are arranged in a V-shape, collectively forming poles. Flux lines 24 emanating from the permanent magnets 20 are shown. The flux lines 24 may permeate through the section 10 and across the airgap 22 into the stator 40. In general, magnetic flux has greater field density when the flux lines 24 are closer together. Redirection of the flux lines 24 may cause an increased magnetic field density in certain locations as shown in FIG. 2A. The stator 40 has windings 42 that are not energized.

Figure 2B:
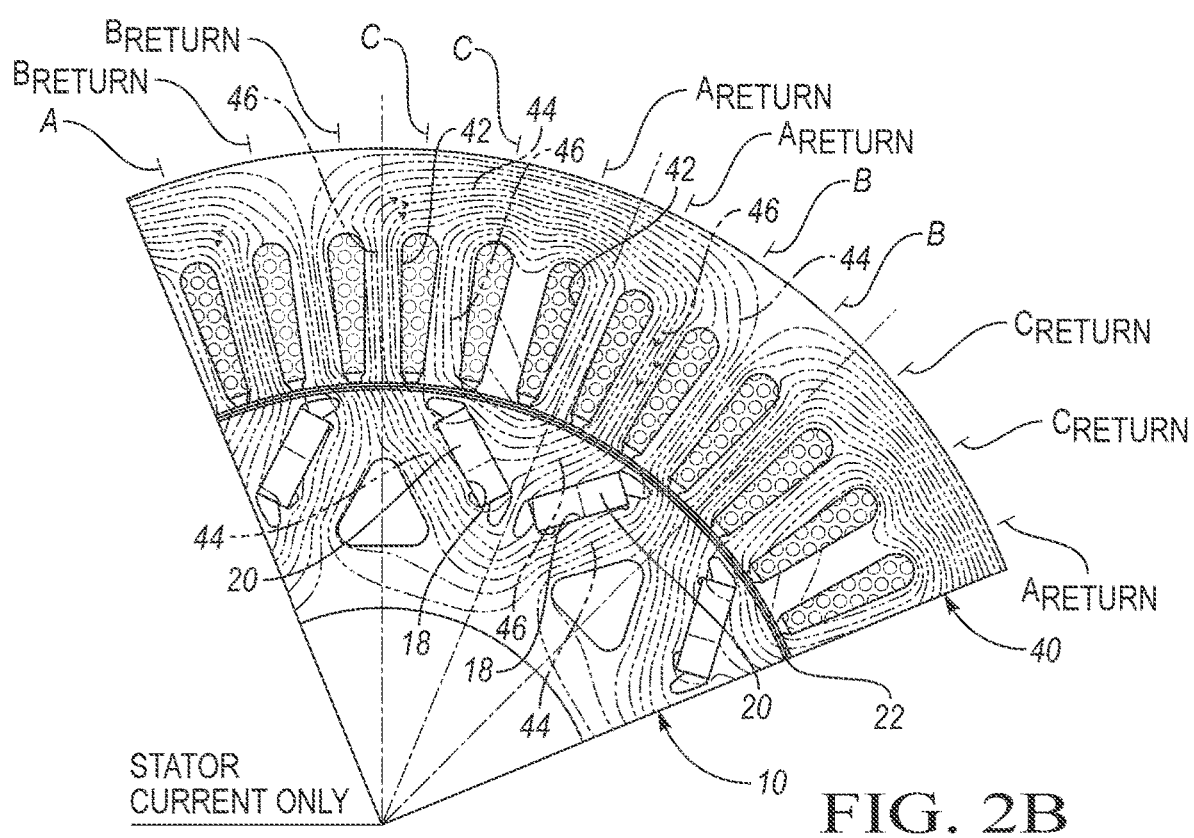
FIG. 2B is a diagrammatic view of an electric machine with a stator comprised of multiple energized windings, wherein the flux lines are generated solely by stator windings.

Referring to FIG. 2B, a section of the section 10 is shown within the stator 40. The stator 40 may have windings 42 that are energized. Flux lines 44 may emanate from the windings 42. The flux lines 44 may permeate through the stator 40 and across the airgap 22 into the section 10. A three-phase motor may have windings A, B, and C. The flux lines 44 and flux lines 24 may at least partially interact at position 46 in known fashion to produce torque.

Figure 3A:
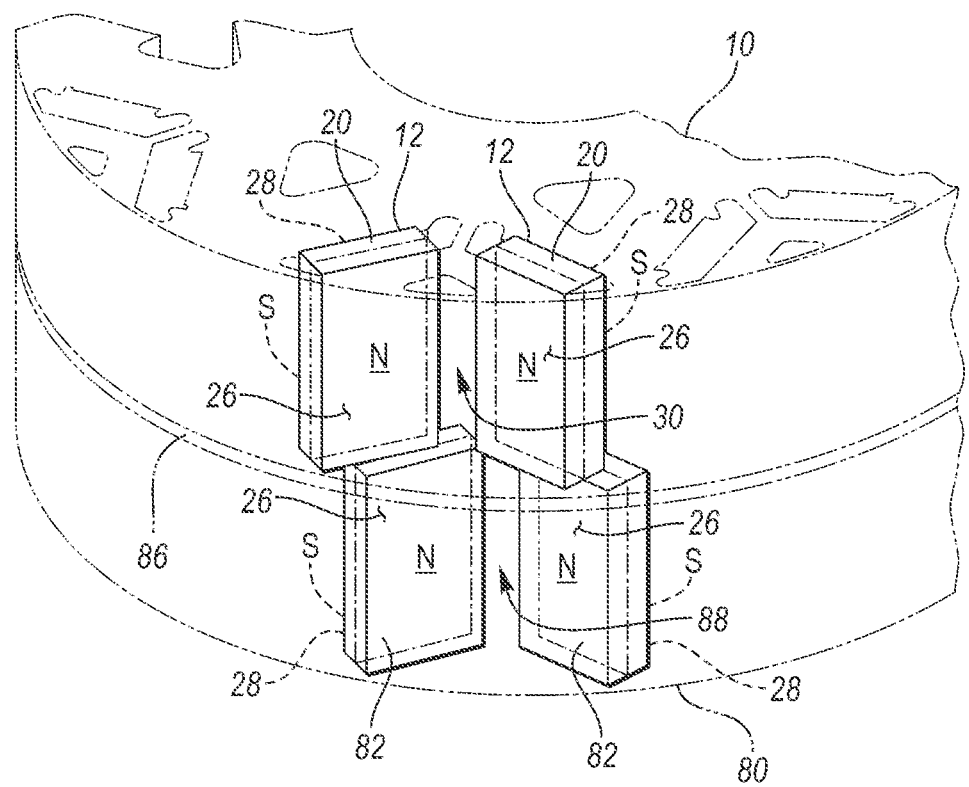
FIG. 3A is a perspective view of a machine rotor with a separator section disposed between two skewed sections.
Figure 3B:
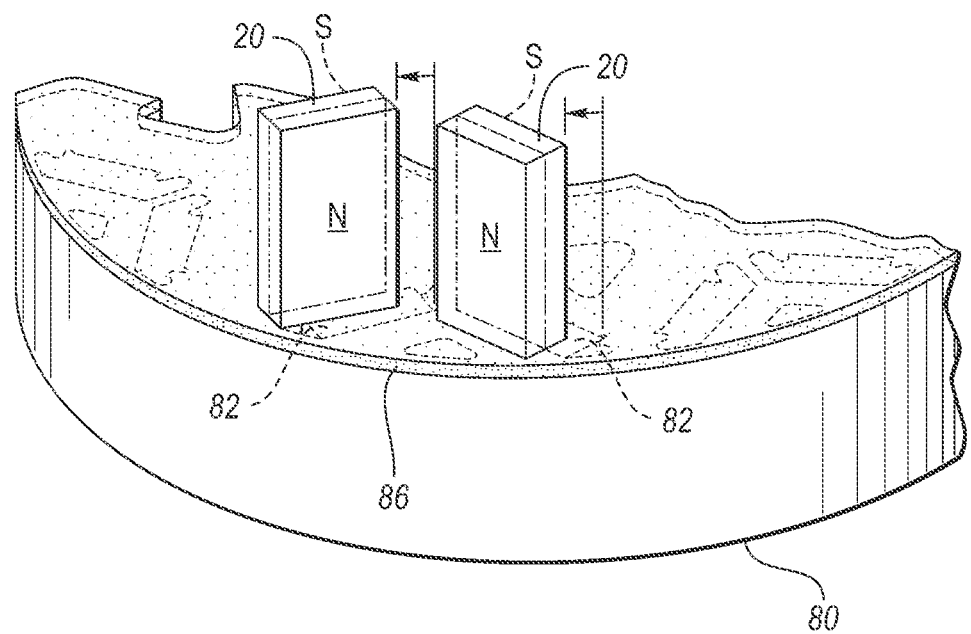
FIG. 3B is a perspective view of a pair of skewed, adjacent sections with a separator section disposed on one of the sections.

Referring to FIG. 3A, a skewed, adjacent pair of sections or laminations 10, 80 may have cavities 12, 84 adapted to hold permanent magnets 20, 82. The permanent magnets 20, 82 may be magnetized such that the north poles 26 face a radially outward direction with respect to the rotor. The permanent magnets 20, 82 may be magnetized such that the south pole 28 faces a generally inward direction. The permanent magnets 20, 82 may be arranged to form magnetic poles 30, 88. The magnetic poles 30, 88 may be skewed or staggered. A separator section or lamination 86 having sections of low magnetic permeability may be disposed between or on at least one of the sections or laminations 10, 80. The separator section's outer diameter may fit flush with the outer diameter of the sections 10, 80, or the separator section's outer diameter may extend beyond or stop short of the outer diameter of the laminations 10, 80. As shown in FIG. 3B, the permanent magnets 20 may be offset from the permanent magnets 82 to form a skewed rotor. A separator section 86 having sections, cutouts, or portions of low magnetic permeability may be placed between the laminations 10, 80.

Figure 4:
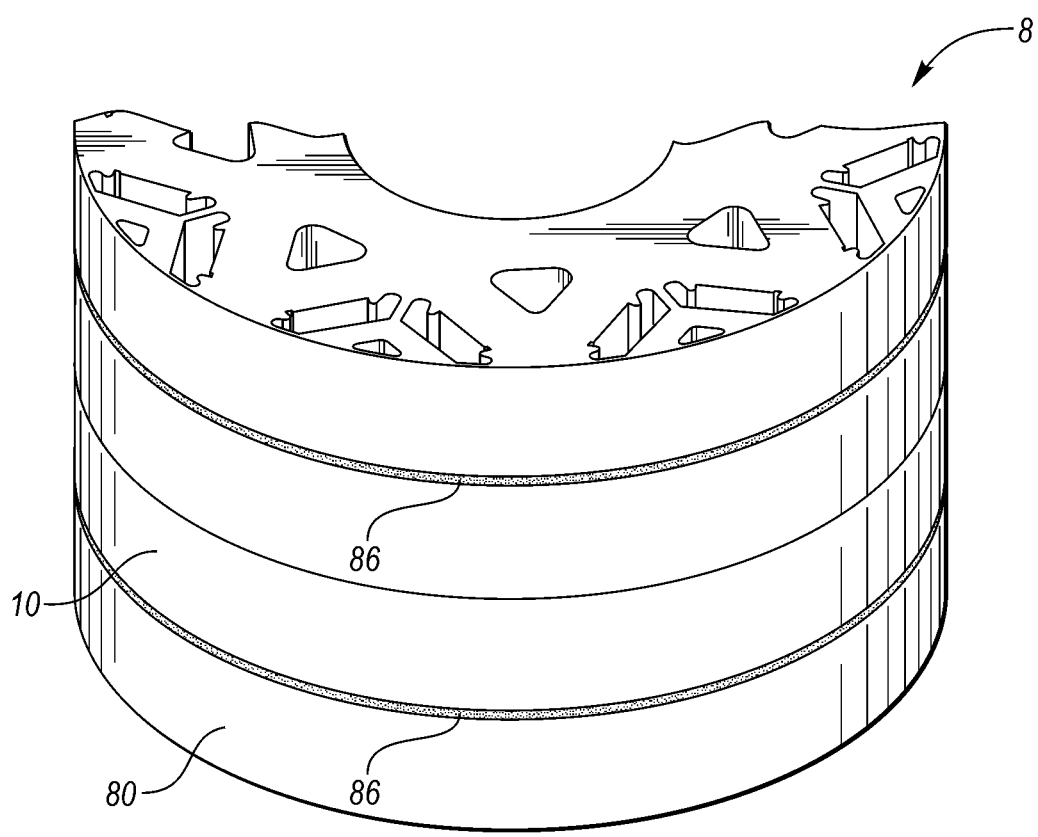
FIG. 4 is a perspective view of a rotor with an ABBA configuration and a separator section between the AB sections.

Referring to FIG. 4, a skewed rotor 8 may have a plurality of laminations 10, 80. The plurality of laminations may be skewed in an ABBA pattern, wherein the letters reference the laminations relative skewing and position in the rotor 8 stack. Separator sections 86 may be interposed between the adjacent AB laminations.

Figure 5:
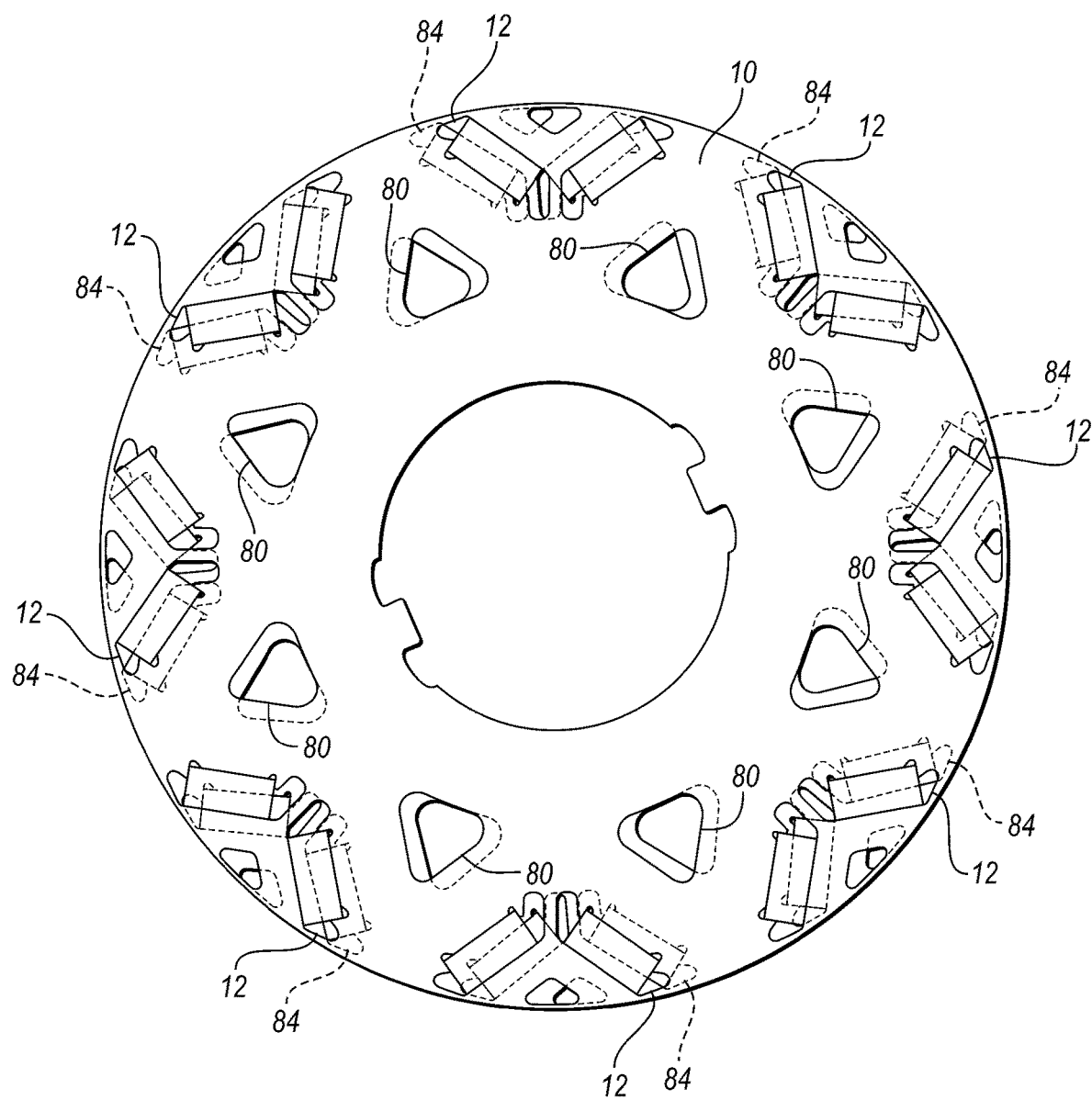
FIG. 5 is a plan view of two overlapped, skewed rotor sections.

Referring to FIG. 5, two skewed or pole-skewed sections 10, 80 of a rotor 8 are shown. The laminations may have over lapping cavities or pockets 12, 84. The pockets 12, 84 have overlapping portions and non-overlapping portions as shown. The laminations may be made of materials having a high magnetic permeability as discussed above.

Figure 6:
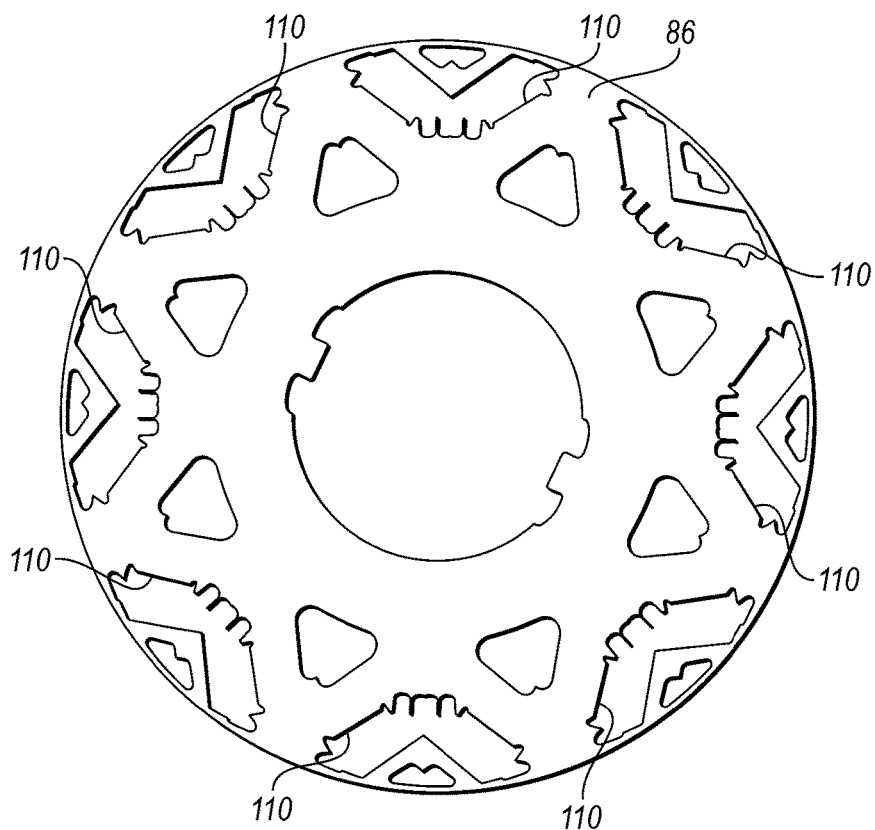
FIG. 6 is a plan view of a separator section having cutout portions.

Referring now to FIG. 6, a separator section 86 defines cutout or magnetically reluctant portions 110 having a shape that is the superposition of the pockets 12, 84. The cutout portions 110 may be left vacant (vacuum), allowed to fill with air, or filled with a material having low magnetic permeability. The separator section 86 may be made of a material similar to the other sections to permit magnetic permeation. Magnetic flux from permanent magnets may flow through the path of least resistance. Meaning the magnetic flux would flow through the areas made of high magnetically permeable material instead of the cutout portions 110.

Figure 7:
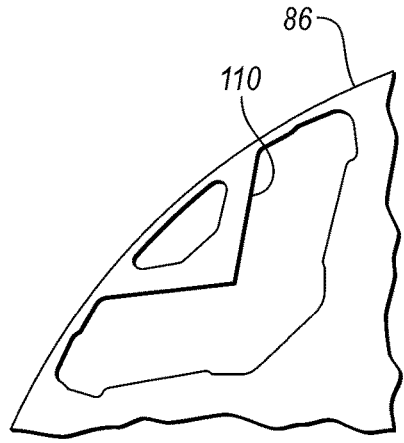
FIG. 7 is a sectional view of a cutout portion of a separator section.

Referring now to FIG. 7, the cutout portions 110 of the separator section 86 may have a smoothed shape, similar to the superposition of the adjacent sections 10, 80. A cutout portion 110 having a smoothed shape may provide similar magnetic flux shaping characteristics, yet provide an improved cooperation with magnetically reluctant filler material. A separator section may include a combination of cutout portion types including cutout portions as depicted in FIG. 8.

Figure 8:
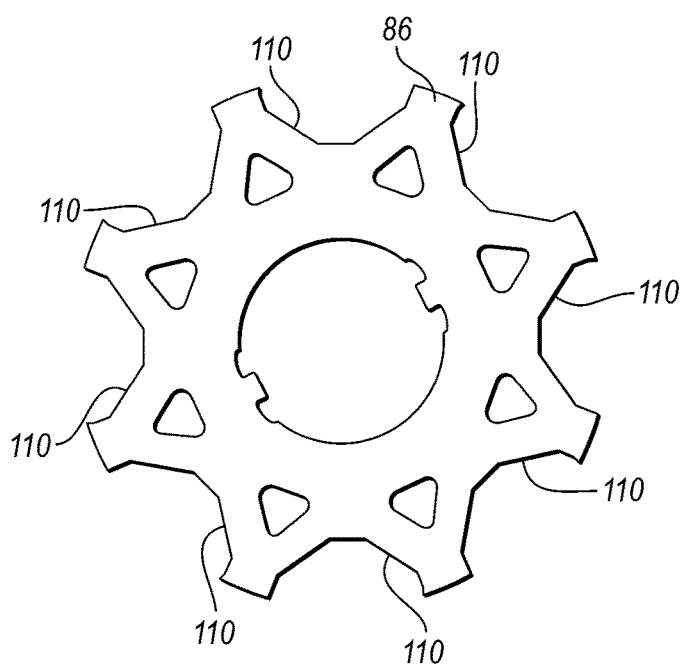
FIG. 8 is a plan view of a separator section having cutout portions.

Referring now to FIG. 8, another example of a separator section 86 is depicted. The separator section 86 may have a shape that defines cutout portions 110. The cutout portions 110 may be open to the airgap between the stator and the rotor or a thin ring may contain the cutout portions 110 to ensure the cutout portions 110 are not exposed to the airgap. The cutout portions 110 may be filled with fitted inserts to fill vacant space and ensure congruence with the other laminations of the rotor 8.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rotor comprising:
    a ferromagnetic separator section disposed between and in contact with a pair of pole-skewed sections, and defining cutout portions that have a shape based on a superposition of permanent magnet pocket shapes associated with the pair of pole-skewed sections and devoid of jagged edge portions, wherein the cutout portions extend radially inward from an outer edge of the ferromagnetic separator section, the cutout portions being configured to impede magnetic flux leakage between permanent magnets.

2. The rotor of claim 1, wherein the pair of pole-skewed sections and separator section are made of different materials.

3. The rotor of claim 1, wherein a thickness of the separator section is less than a thickness of each of the pair of pole-skewed sections.

4. The rotor of claim 1, wherein the pair of pole-skewed sections and separator section are made of the same material.

5. The rotor of claim 1, wherein the separator section has a diamagnetic or paramagnetic material disposed within the cutout portions.

6. The rotor of claim 5, wherein the cutout portions of the separator section have a magnetic permeability less than two.

7. A rotor comprising:
    a ferromagnetic separator section disposed between and in contact with a pair of pole-skewed sections, and defining cutout portions that have a shape based on a superposition of permanent magnet pocket shapes associated with the pair of pole-skewed sections and devoid of jagged edge portions, wherein the cutout portions open to an airgap between the ferromagnetic separator section and a stator surrounding the rotor, the cutout portions being configured to impede magnetic flux leakage between permanent magnets.

8. The rotor of claim 7, wherein the ferromagnetic separator section has a diamagnetic or paramagnetic material disposed within at least one of the cutout portions.

9. The rotor of claim 7, wherein the cutout portions of the ferromagnetic separator section have a magnetic permeability less than two.

10. The rotor of claim 7, wherein the pair of pole-skewed sections and the ferromagnetic separator section are made of different materials.

11. The rotor of claim 7, wherein a thickness of the ferromagnetic separator section is less than a thickness of each of the pair of pole-skewed sections.

12. The rotor of claim 7, wherein the cutout portions are further based on the superposition of the permanent magnet pockets.

\* \* \* \* \*